(12) United States Patent
Wakazono et al.

(10) Patent No.: US 9,310,589 B2
(45) Date of Patent: Apr. 12, 2016

(54) IMAGE PICKUP APPARATUS

(71) Applicant: CANON KABUSHIKI KAISHA, Tokyo (JP)

(72) Inventors: Tsuyoshi Wakazono, Utsunomiya (JP); Shohei Kikuchi, Utsunomiya (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 38 days.

(21) Appl. No.: 14/224,116

(22) Filed: Mar. 25, 2014

(65) Prior Publication Data
US 2014/0293123 A1 Oct. 2, 2014

(30) Foreign Application Priority Data
Mar. 29, 2013 (JP) ................. 2013-072746

(51) Int. Cl.
*H04N 5/232* (2006.01)
*H04N 5/235* (2006.01)
*G02B 13/16* (2006.01)
*G02B 27/00* (2006.01)
*G02B 7/00* (2006.01)
*G02B 13/04* (2006.01)

(52) U.S. Cl.
CPC ............... G02B 13/16 (2013.01); G02B 7/008 (2013.01); G02B 13/04 (2013.01); G02B 27/005 (2013.01); G02B 27/0081 (2013.01); H04N 5/2355 (2013.01); H04N 5/23296 (2013.01)

(58) Field of Classification Search
CPC ............ H04N 5/23296; H04N 5/2355; G02B 27/005; G02B 27/0081; G02B 13/16; G02B 13/04

USPC ......................................... 348/361
See application file for complete search history.

(56) References Cited

U.S. PATENT DOCUMENTS 6,968,128 B2 * 11/2005 Itoh ................. 396/79

FOREIGN PATENT DOCUMENTS

| CN | 101900869 A | 12/2010 |
|----|-------------|---------|
| CN | 102736229 A | 10/2012 |
| JP | 2005-221920 A | 8/2005 |
| JP | 2005-321426 A | 11/2005 |
| JP | 2008-233610 A | 10/2008 |
| JP | 2009-93118 A | 4/2009 |

OTHER PUBLICATIONS

Chinese Office Action issued in corresponding application No. 201410112142.7 on Feb. 6, 2016.

* cited by examiner

*Primary Examiner* — David N Spector
(74) *Attorney, Agent, or Firm* — Carter, DeLuca, Farrell & Schmidt, LLP

(57) ABSTRACT

Provided is an image pickup apparatus including, in order from an object side: a first lens unit; a stop; a second lens unit having a positive refractive power; and an image pickup element. The second lens unit includes a second lens sub-unit including only at least one positive lens. A refractive index (N2a) at a d-line of every lens included in the second lens sub-unit, an Abbe constant (ν2a) and a partial dispersion ratio (θ2a) of the every lens, a temperature-related relative refractive index change (dn2a/dTrelative) at the d-line, a focal length (f) of the overall system, a focal length (f2a) of the second lens sub-unit, an overall length (TD) of an image pickup lens, and a distance (BF) from an image-side surface of a lens arranged closest to an image side in the image pickup lens to an image plane of the image pickup element satisfy predetermined relationships.

7 Claims, 11 Drawing Sheets

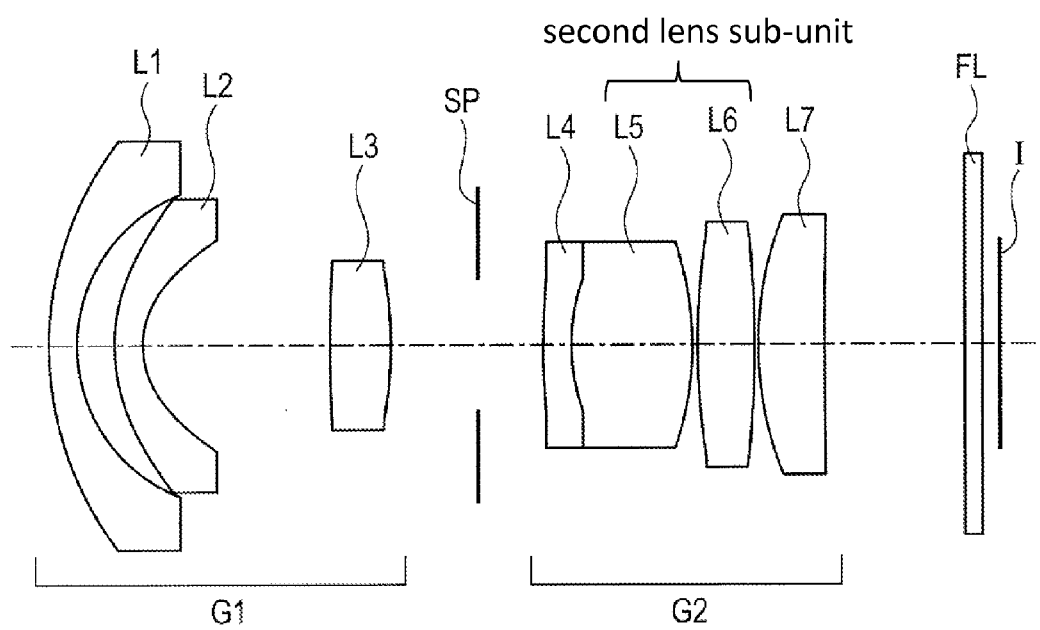

IMAGE PICKUP APPARATUS

BACKGROUND OF THE INVENTION

1. Field of the Invention

The present invention relates to an image pickup apparatus, and more particularly, to an image pickup apparatus including an image pickup lens for forming a subject image on an image pickup element such as a CCD sensor and a CMOS sensor. The present invention relates to an image pickup apparatus including an image pickup lens, which is suitable for a monitoring camera, a network camera, an on-board camera, a digital camera, and the like.

2. Description of the Related Art

Monitoring cameras have hitherto been required to be compact and lightweight with a wide imaging range and be compatible with low illuminance. With recent improvements in resolution of sensors, the monitoring cameras are now required to have high resolution compatible with full HD. Because of this, an image pickup lens to be mounted in a monitoring camera is required to be compact and lightweight with a wide horizontal angle of field of 75° or more and a small f-number and have high optical performance. Japanese Patent Application Laid-Open No. 2005-221920 proposes a low-cost and compact optical system having satisfactory optical performance with a maximum angle of field of approximately 85°. Japanese Patent Application Laid-Open No. 2008-233610 proposes an optical system having satisfactory optical performance with a maximum angle of field of 70° to 80°, an f-number of 2.0, and six lenses.

In general, an image pickup lens for monitoring is preferred to have satisfactorily corrected chromatic aberration in order to obtain satisfactory imaging performance.

In general, the monitoring cameras are used in a wide temperature range including cold areas and tropical areas. It is therefore important particularly for a so-called pan-focus lens having no focus mechanism to suppress a temperature-related imaging position change because the occurrence of the temperature-related imaging position change may change the range of the depth of field in focus (that is, the pan-focus range).

Japanese Patent Application Laid-Open No. 2005-221920 uses a plastic aspherical lens, which has a large temperature-related refractive index change, in order to obtain satisfactory optical performance with a compact and lightweight structure at low cost. Accordingly, there is a problem in that an imaging position may be changed due to a temperature change.

In Japanese Patent Application Laid-Open No. 2008-233610, the structure in which a third lens unit contributing to image formation is made of a glass material cannot satisfactorily correct the secondary spectrum of axial chromatic aberration.

SUMMARY OF THE INVENTION

The present invention provides an image pickup lens which is compact and lightweight with a wide angle of field and a small f-number and has high optical performance with satisfactorily corrected chromatic aberration and in which a temperature-related imaging position change is suppressed, and provide an image pickup apparatus including the same.

An image pickup apparatus according to one embodiment of the present invention includes: an image pickup lens; and an image pickup element, the image pickup lens including in order from an object side to an image side: a first lens unit; a stop; and a second lens unit having a positive refractive power, the second lens unit including a second lens sub-unit composed of one or more positive lenses, wherein each of the positive lenses included in the second lens sub-unit is made of material satisfying the following conditions:

$$62 < v2a;$$

$$N2a < 1.63;$$

$$0.605 - (v2a/1000) < \theta 2a; \text{ and}$$

$$dn2a/dT\text{relative} \leftarrow 2.4 \times 10^{-6},$$

where N2a represents a refractive index at a d-line, v2a represents an Abbe constant, θ2a represents a partial dispersion ratio, and dn2a/dTrelative represents an absolute value of a differential of refractive indices against temperature at the d-line, and in which the following conditions are satisfied:

$$0.20 < f/f2a < 0.80; \text{ and}$$

$$3.00 < TD/BF < 6.50,$$

where f represents a focal length of the image pickup lens, f2a represents a focal length of the second lens sub-unit, TD represents an overall length of the image pickup lens, and BF represents a distance from an image-side surface of a lens arranged closest to an image side in the image pickup lens to an image plane of the image pickup element.

According to one embodiment of the present invention, it is possible to obtain the image pickup lens which is capable of achieving a compact and lightweight structure with a wide angle of field and a small f-number and high optical performance with satisfactorily corrected chromatic aberration and capable of satisfactorily correcting an imaging position shift caused by a temperature change, and obtain the image pickup apparatus including the same.

Further features of the present invention will become apparent from the following description of exemplary embodiments with reference to the attached drawings.

BRIEF DESCRIPTION OF THE DRAWINGS

FIG. 1 is a lens cross-sectional view according to Numerical Embodiment 1 of the present invention.

DESCRIPTION OF THE EMBODIMENTS

Exemplary embodiments of the present invention are now described in detail with reference to the accompanying drawings.

FIG. 1 is a lens cross-sectional view of an image pickup lens according to Embodiment 1 (Numerical Embodiment 1) of the present invention. The image pickup lens according to this embodiment includes, in order from the object side to the image side, a first lens unit G1, an aperture stop SP, and a second lens unit G2 having a positive refractive power. The first lens unit G1 includes, in order from the object side to the image side, negative meniscus lenses L1 and L2 each having a convex surface facing the object side, and a positive lens L3. A parallel flat plate FL corresponds to a low pass filter, an IR cut filter, or the like. An image plane I corresponds to an image plane of a solid-state image pickup element (photoelectric transducer) or the like for receiving subject light and subjecting the light to photoelectric conversion.

Figure 2A:
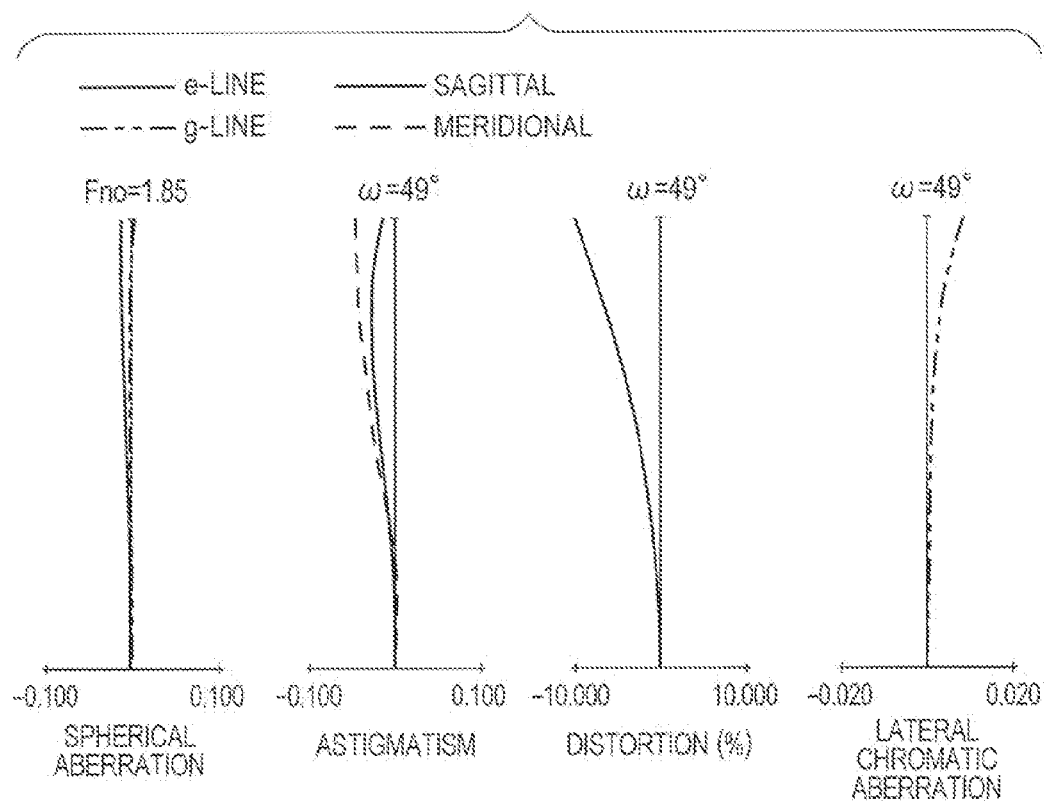
FIG. 2A is a longitudinal aberration diagram at an object distance of 1 m according to Numerical Embodiment 1.
Figure 2B:
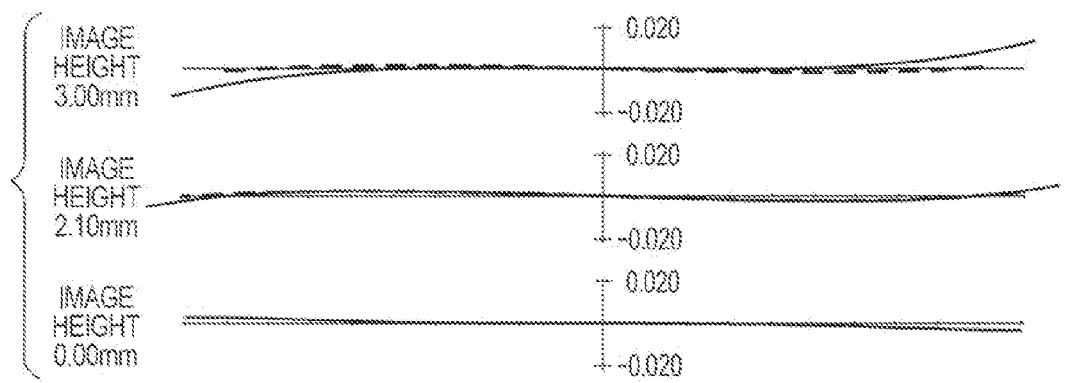
FIG. 2B is a lateral aberration diagram at an object distance of 1 m according to Numerical Embodiment 1.

FIG. 2A is a longitudinal aberration diagram at an object distance of 1 m according to Numerical 1, in which the unit is mm (% only for distortion). Spherical aberration is illustrated with respect to e-line (represented with a solid line) and g-line (represented with a chain double-dashed line). Astigmatism is illustrated with respect to e-line on a sagittal image plane (represented with a solid line) and on a meridional image plane (represented with a broken line). Lateral chromatic aberration is illustrated with respect to g-line (represented with a chain double-dashed line). An f-number is represented by Fno and a half angle of field is represented by ω. The longitudinal aberration diagram shows the spherical aberration on the scale of 0.1 mm, the astigmatism on the scale of 0.1 mm, the distortion on the scale of 10%, and the lateral chromatic aberration on the scale of 0.02 mm. FIG. 2B is a lateral aberration diagram at an object distance of 1 m according to Numerical Embodiment 1, and shows sagittal ray aberration (solid line) and meridional ray aberration (dotted line) at the e-line on the scale of 0.02 mm. The aberration diagrams in the following embodiments also have exactly the same notation and scale.

The image pickup lens and an image pickup apparatus including the same according to the present invention each include, in order from the object side to the image side, a first lens unit having a positive or negative refractive power, a stop, and a second lens unit having a positive refractive power. The second lens unit includes a second lens sub-unit including composed of one or more positive lens, wherein each of the positive lenses included in the second lens sub-unit is made of material satisfying the following conditions:

$62 < v2a$;

$N2a < 1.63$;

$0.605 - (v2a/1000) < \theta 2a$; and $dn2a/dT\text{relative} \leftarrow 2.4 \times 10^{-6}$, where N2a represents the refractive index at the d-line, v2a represents the Abbe constant, θ2a represents the partial dispersion ratio, and dn2a/dTrelative represents an absolute value of a differential of refractive indices against temperature at the d-line. Further, the following conditional expressions are satisfied:

$$0.20 < f/f2a < 0.80 \quad (1); \text{ and}$$

$$3.00 < TD/BF < 6.50 \quad (2),$$

where f represents a focal length of the overall system, f2a represents a focal length of the second lens sub-unit, TD represents an overall length of the image pickup lens, and BF represents a distance from an image-side surface of a lens arranged closest to the image side in the image pickup lens to the image plane.

Now, a description is given of how to achieve both the correction of chromatic aberration and the suppression of an imaging position change caused by a temperature change, which are the feature of the present invention.

First, a method of correcting the chromatic aberration is described in terms of a chromatic aberration correction condition and the correction of the secondary spectrum in a thin system having closely-arranged lenses. The chromatic aberration correction condition in the thin system having closely-arranged lenses can be expressed by the following expression.

$$\sum_{i=1}^{k} \frac{\phi_i}{v_i} = 0 \quad (a)$$

where φ represents lens power and is defined as the reciprocal of the focal length. The index i represents the number of each lens. ν represents the Abbe constant and can be expressed by the following expression.

$$v = \frac{(N_d - 1)}{(N_F - N_c)} \quad (b)$$

where Nd, NF, and Nc represent refractive indices at the d-line (587.6 nm), the F-line (486.1 nm), and the C-line (656.3 nm) among the Fraunhofer lines.

The second lens unit has a strong positive refractive power as a whole, and hence, in order to satisfy the chromatic aberration correction condition of Expression (a), it is necessary to use an optical material having a large Abbe constant, namely a low dispersion material for a positive lens, and to use an optical material having a small Abbe constant, namely a high dispersion material for a negative lens.

Next, attention is focused on another chromatic aberration correction condition at the g-line (435.8 nm), which is shorter in wavelength than the F-line, namely the so-called secondary spectrum. The partial dispersion ratio for the g-line and the F-line is represented by θgF and can be expressed by the following expression.

$$\theta_{gF} = \frac{(N_g - N_F)}{(N_F - N_C)} \quad (c)$$

An existing optical material has a tendency that the partial dispersion ratio θgF becomes larger as an Abbe constant νd becomes smaller while the partial dispersion ratio θgF becomes smaller as the Abbe constant νd becomes larger.

In the second lens unit, an optical material having a small Abbe constant is used for the negative lens in order to satisfy the chromatic aberration correction conditions for two colors at the F-line and the C-line, with the result that the partial dispersion ratio θgF of the negative lens has a large value. Accordingly, based on Expression (c), the refractive index at the g-line is increased, and an imaging position for the g-line remains in the image side direction (hereinafter referred to as "over" side), which is responsible for a residual secondary spectrum. To address this problem, an extraordinary dispersion material whose partial dispersion ratio θgF has a large value even with a large Abbe constant is used for the positive lens. This selection can correct the residual secondary spectrum.

From the viewpoint of the aberration theory, the axial chromatic aberration is proportional to the square of an object paraxial ray height hi, and the lateral chromatic aberration is proportional to the product of the object paraxial ray height hi and a pupil paraxial ray height hbi. Both the axial chromatic aberration and the lateral chromatic aberration are proportional to a refractive power φi of each lens. The secondary spectrum can therefore be satisfactorily corrected by applying an extraordinary dispersion material to a lens whose paraxial ray height is large and whose refractive power is high.

The extraordinary dispersion material according to the present invention is defined to satisfy all the following conditions.

$$62 < \nu d \quad (d)$$

$$Nd < 1.63 \quad (e)$$

$$0.605 - (\nu d/1000) < \theta gF \quad (f)$$

$$dn/dT\text{relative} < -2.4 \times 10^{-6} \quad (g)$$

In Expression (g), dn/dTrelative represents a temperature-related relative refractive index change at the d-line. The relative refractive index change is defined as a temperature-related change in refractive index in the air having the same temperature as that of an optical material. In general, the extraordinary dispersion material has a negative value of the temperature-related relative refractive index change dn/dTrelative.

Next, the imaging position change caused by the temperature change is described.

There are two main dominant factors for the imaging position change caused by the temperature change. The first factor is a refractive index change of an optical material caused by the temperature change. The second factor is a lens interval change caused by expansion and contraction of a lens barrel.

First, the refractive index change of an optical material caused by the temperature change is described.

An imaging position change dskGi/dn caused by a refractive index change in an arbitrary lens can be expressed by the following expression by using the object paraxial ray height hi, the lens refractive power φi, and the lens refractive index Ni. The index i represents the number of each lens.

$$\frac{d skG_i}{d n_i} \propto -h_i^2 \cdot \phi_i \cdot \frac{\Delta N}{N_i} \quad (h)$$

Expression (h) shows that the imaging position in the case of a positive lens is changed to the object side (hereinafter referred to as "under" side) due to the refractive index change, and the imaging position in the case of a negative lens is changed to the "over" side due to the refractive index change. The imaging position change dskGi/dn caused by the refractive index change becomes larger as the object paraxial ray height hi becomes larger, the lens refractive power φi becomes higher, and the lens refractive index Ni becomes lower. An imaging position change dskG/dT caused by a refractive index change of an optical material due to the temperature change can be expressed by the following expression.

$$\frac{d skG}{d T} = \sum_{i=1}^{k} \left( \frac{d skG_i}{d n_i} \times \frac{d n_i}{d T} \right) \quad (i)$$

Expression (i) shows that, when the extraordinary dispersion material is applied to a lens whose object paraxial ray height is large and whose refractive power is high in order to satisfactorily correct the secondary spectrum of axial chromatic aberration, the value of the imaging position change dskG/dT caused by the temperature change is large on the "over" side.

Next, an imaging position change caused by temperature-related expansion and contraction of the lens barrel is described.

An imaging position change dskM/dT caused by expansion and contraction of the lens barrel due to the temperature change can be expressed by the following expression.

$$\frac{d skM}{d T} = \sum_{i=1}^{k} \left( \alpha_i \times D_i \times \frac{d sk_i}{d D} \right) \quad (j)$$

where αi represents a linear expansion coefficient of a material of a lens barrel member, Di represents a lens interval, and dski/dD represents an imaging position change caused by a lens interval change. The index i represents the number of each lens interval. When the lens barrel expands due to an increase in temperature to increase an arbitrary lens interval regulated by the lens barrel member, an object point of a lens unit arranged on the image side with respect to the interval moves farther, and hence the imaging position is always changed to the "under" side. Also when a distance from an image-side surface of a lens arranged closest to the image side in the image pickup lens unit to the image plane (hereinafter referred to as "back focus") is increased due to expansion of the lens barrel member, the imaging position is changed to the "under" side. In view of the above, the imaging position change dskM/dT caused by expansion and contraction of the lens barrel due to the temperature change exhibits the value on the "under" side.

Based on Expression (i) and Expression (j), the temperature-related imaging position change can be expressed by the following expression.

$$\frac{d sk_{total}}{d T} = \frac{d skG}{d T} + \frac{d skM}{d T} \quad (k)$$

Expression (k) shows that appropriate selection of the material of the lens barrel member can correct the imaging position change, whose value changes to the "over" side with an increase in temperature because of the use of the extraordinary dispersion material, to have a value on the "under" side. As a result, the imaging position change caused by the temperature change can be suppressed.

In particular, the back focus needs to have a large interval because a low pass filter, an IR cut filter, or the like is arranged therein. The interval change is equivalent to the imaging position change (that is, dsk/dD=−1), and is therefore a dominant factor for the imaging position change caused by temperature-related expansion and contraction of the lens barrel. Consequently, it is necessary to appropriately select the material of the lens barrel member for regulating the back focus.

Conditional Expression (1) defines the ratio of the focal length of the second lens sub-unit to the focal length of the overall system, thereby defining the condition for suppressing the imaging position change caused by the temperature change while satisfactorily correcting the secondary spectrum of axial chromatic aberration. When the value exceeds the upper limit of Expression (1), the refractive power of the second lens sub-unit becomes too high, with the result that the imaging position is excessively changed to the "over" side with an increase in temperature. When the value falls below the lower limit of Expression (1), the refractive power of the second lens sub-unit becomes too low, with the result that the secondary spectrum of axial chromatic aberration is insufficiently corrected. It is more preferred to set Expression (1) as follows.

$$0.30 < f/f2a < 0.68 \quad (1\text{-a})$$

Conditional Expression (2) defines the ratio of the back focus to the overall length of the image pickup lens (the length from the vertex of an object-side surface of a lens arranged closest to the object side in the image pickup lens to the vertex of an image-side surface of a lens arranged closest to the image side in the image pickup lens), thereby defining the condition for suppressing the temperature-related imaging position change. When the value exceeds the upper limit of Expression (2), the back focus becomes too short relative to the overall length of the image pickup lens, with the result that it is difficult to arrange an optical filter, such as a low pass filter and an IR cut filter. When the value falls below the lower limit of Expression (2), the back focus becomes too long relative to the overall length of the image pickup lens, with the result that the imaging position is excessively changed to the "under" side when the lens barrel member for regulating the back focus expands with an increase in temperature. In addition, the image pickup apparatus is upsized due to the increased back focus. It is more preferred to set Expression (2) as follows.

$$3.80 < TD/BF < 5.50 \quad (2\text{-a})$$

The image pickup lens and the image pickup apparatus including the same according to the present invention each satisfy the following condition:

$$0.40 < f^2/(Y \times Fno) < 3.00 (\text{unit:mm}) \quad (3)$$

where Y represents a maximum image height at the image pickup element and Fno represents an f-number in an infinite state.

Conditional Expression (3) defines the focal length of the overall system, the maximum image height at the image pickup element, and the f-number in the infinite state, thereby defining a hyperfocal distance, namely a minimum object distance. A hyperfocal distance sh can be expressed by the following expression:

$$sh = f^2/(\epsilon \times Fno)(\text{unit:mm}) \quad (l),$$

where ε represents a permissible circle of confusion.

In addition, ε is proportional to a pixel pitch p of the image pickup element I. The pixel pitch p can be expressed as follows:

$$p = 2 \times Y/n \quad (m),$$

where n represents the number of pixels in the diagonal direction of the image pickup element. The hyperfocal distance sh can therefore be replaced with the following expression based on Expressions (l) and (m).

$$sh \propto f^2/(Y \times Fno)(\text{unit:mm}) \quad (n)$$

When the value exceeds the upper limit of Expression (3), the focal length of the overall system becomes too long, with the result that a wide angle of field cannot be achieved. When the value falls below the lower limit of Expression (3), the focal length of the overall system becomes too short, with the result that it is difficult to correct various kinds of aberration including distortion. In addition, the hyperfocal distance is increased to narrow a subject distance range in focus. It is more preferred to set Expression (3) as follows.

$$0.64 < f^2/(Y \times Fno) < 2.4 (\text{unit:mm}) \quad (3\text{-a})$$

The image pickup lens and the image pickup apparatus including the same according to the present invention each satisfy the following condition:

$$1.50 \times 10^{-5} < \alpha < 2.50 \times 10^{-5} \quad (4),$$

where α represents the linear expansion coefficient of the material of the lens barrel member for regulating the back focus.

Conditional Expression (4) defines the linear expansion coefficient of the material of the lens barrel member for regulating the back focus, thereby defining the condition for suppressing the temperature-related imaging position change. When such a material that exceeds the upper limit of Expression (4) is selected as the lens barrel member for regulating the back focus, the imaging position is excessively changed to the "under" side with an increase in temperature. When such a material that falls below the lower limit of Expression (4) is selected as the lens barrel member for regulating the back focus, the imaging position change caused by a refractive index change of the extraordinary dispersion material due to an increase in temperature cannot be suppressed, with the result that the imaging position is changed to the "over" side.

The image pickup lens according to the present invention satisfies the following conditions:

$$0.20 < f/f2 < 0.70 \quad (5); \text{ and}$$

$$2.00 < v2p/v2n < 6.00 \quad (6),$$

where f2 represents a focal length of the second lens unit, v2p represents an average value of Abbe constants of the positive lenses of the second lens unit, and v2n represents an average value of Abbe constants of the negative lenses of the second lens unit.

Conditional Expression (5) defines the ratio of the focal length of the second lens unit to the focal length of the overall system, thereby defining the condition for achieving a wide angle of field and high performance. When the value exceeds the upper limit of Expression (5), the refractive power of the second lens unit becomes too high, with the result that it is difficult to correct various kinds of aberration. When the value falls below the lower limit of Expression (5), the refractive power becomes too low, with the result that it is difficult to obtain an angle of field wide enough for the monitoring purpose or the like. It is more preferred to set Expression (5) as follows.

$$0.30 < f/f2 < 0.50 \quad (5\text{-a})$$

Conditional Expression (6) defines the ratio of the Abbe constants between the positive lens and the negative lens of the second lens unit, thereby defining the condition for achieving the suppression of chromatic aberration and various kinds of aberration. When the value exceeds the upper limit of Expression (6), the axial chromatic aberration is excessively corrected. When the value falls below the lower limit of Expression (6), the individual lens refractive powers in the second lens unit become too large, with the result that various kinds of aberration are increased to make it difficult to obtain high optical performance. It is more preferred to set Expression (6) as follows.

$$2.80 < \nu 2p/\nu 2n < 5.30 \quad (6\text{-}a)$$

In the image pickup lens according to the present invention, the second lens unit is preferred to include a cemented lens of a negative lens and a positive lens, and it is preferred to satisfy the following conditional expression:

$$0.20 < ncn - ncp < 0.60 \quad (7),$$

where ncn represents a refractive index of the negative lens of the cemented lens and ncp represents a refractive index of the positive lens of the cemented lens.

The cemented lens is structured to effectively correct the chromatic aberration. When a refractive index difference between the positive lens and the negative lens forming the cemented lens included in the second lens unit is increased, a refractive power at a cemented surface for a reference wavelength (d-line) can be increased to correct spherical aberration and coma as well as the chromatic aberration. When the value exceeds the upper limit of Expression (7), the ratio of the Abbe constants becomes too large in the case of an existing lens material, with the result that the axial chromatic aberration is excessively corrected. When the value falls below the lower limit of Expression (7), the refractive power at the cemented surface becomes too low, with the result that the aberration correction effect cannot be obtained at the cemented surface. It is more preferred to set Expression (7) as follows.

$$0.33 < ncn - ncp < 0.57 \quad (7\text{-}a)$$

The image pickup lens according to the present invention is preferred to satisfy the following conditions:

$$-0.25 < f/f1 < 0.25 \quad (8);$$

$$0.20 < \nu 1p/\nu 1n < 0.70 \quad (9); \text{ and}$$

$$1.85 < n1p < 2.40 \quad (10),$$

where f1 represents the focal length of the first lens unit, $\nu 1p$ represents an average value of Abbe constants of the positive lens of the first lens unit, $\nu 1n$ represents an average value of Abbe constants of the negative lenses of the first lens unit, and n1p represents the refractive index at the d-line of the positive lens of the first lens unit.

Conditional Expression (8) defines the ratio of the focal length of the first lens unit to the focal length of the overall system. When the value exceeds the upper limit of Expression (8), the convergence of light flux entering the second lens unit becomes too large, with the result that it is difficult to ensure a sufficient back focus. When the value falls below the lower limit of Expression (8), the divergence of light flux entering the second lens unit becomes too large, with the result that it is difficult to correct various kinds of aberration. It is more preferred to set Expression (8) as follows.

$$-0.21 < f/f1 < 0.12 \quad (8\text{-}a)$$

Conditional Expression (9) defines the ratio of the average values of the Abbe constants between the positive lens and the negative lenses of the first lens unit. When the value exceeds the upper limit of Expression (9), the axial chromatic aberration is excessively corrected. When the value falls below the lower limit of Expression (9), the axial chromatic aberration is insufficiently corrected. It is more preferred to set Expression (9) as follows.

$$0.25 < \nu 1p/\nu 1n < 0.63 \quad (9\text{-}a)$$

Conditional Expression (10) defines the refractive index at the d-line of the positive lens of the first lens unit. Generation of negative distortion is suppressed in the first negative lens and the second negative lens, and further, by generating positive distortion in the positive lens of the first lens unit, the negative distortion is more effectively reduced. Off-axial rays need to be greatly refracted in order to generate the positive distortion, but this generates high-order halo and coma at a peripheral image height. To suppress the generation of such high-order aberration, it is effective to increase the refractive index n1p to weaken the refractive power of the positive lens. When the value exceeds the upper limit of Expression (10), the Abbe constant becomes too small in the case of an existing lens material, with the result that the axial chromatic aberration is insufficiently corrected or it is difficult to achieve the correction of both the axial chromatic aberration and the lateral chromatic aberration. When the value falls below the lower limit of Expression (10), the refractive power of the positive lens is increased to increase the high-order halo and coma, with the result that it is difficult to achieve satisfactory optical performance. It is more preferred to set Conditional Expression (10) as follows.

$$1.88 < n1p < 2.20 \quad (10a)$$

Next, the features of lens structures according to embodiments of the present invention are described.

Now referring to FIG. 1, a specific lens structure according to Embodiment 1 of the present invention is described.

Embodiment 1

FIG. 1 is a lens cross-sectional view of an image pickup lens according to Embodiment 1 (Numerical Embodiment 1) of the present invention. The image pickup lens according to Embodiment 1 (Numerical Embodiment 1) includes, in order from the object side to the image side, a first lens unit G1, an aperture stop SP, and a second lens unit G2 having a positive refractive power. The first lens unit G1 includes, in order from the object side to the image side, negative meniscus lenses L1 and L2 each having a convex surface facing the object side, and a positive lens L3. The second lens unit G2 includes, in order from the object side to the image side, a cemented lens in which a negative lens L4 and a positive lens L5 are cemented together, a positive lens L6, and a positive lens L7. Note that, extraordinary dispersion glass is used for the positive lenses L5 and L6, and the positive lenses L5 and L6 serve as a second lens sub-unit.

A parallel flat plate FL corresponds to a low pass filter, an IR cut filter, or the like. An image plane I corresponds to an image plane of a solid-state image pickup element (photoelectric transducer) or the like for receiving light of an image formed by the lens and subjecting the light to photoelectric conversion. Note that, the material of a lens barrel member for regulating a distance between lenses and a back focus is aluminum.

Table 1 shows corresponding values of Embodiment in regard to Conditional Expressions (1) to (10). Numerical Embodiment 1 satisfies all the conditional expressions, thereby realizing an image pickup lens which is compact and lightweight with a large angle of field and a small f-number and in which chromatic aberration is satisfactorily corrected and a temperature-related imaging position change is suppressed.

Embodiment 2

Figure 3:
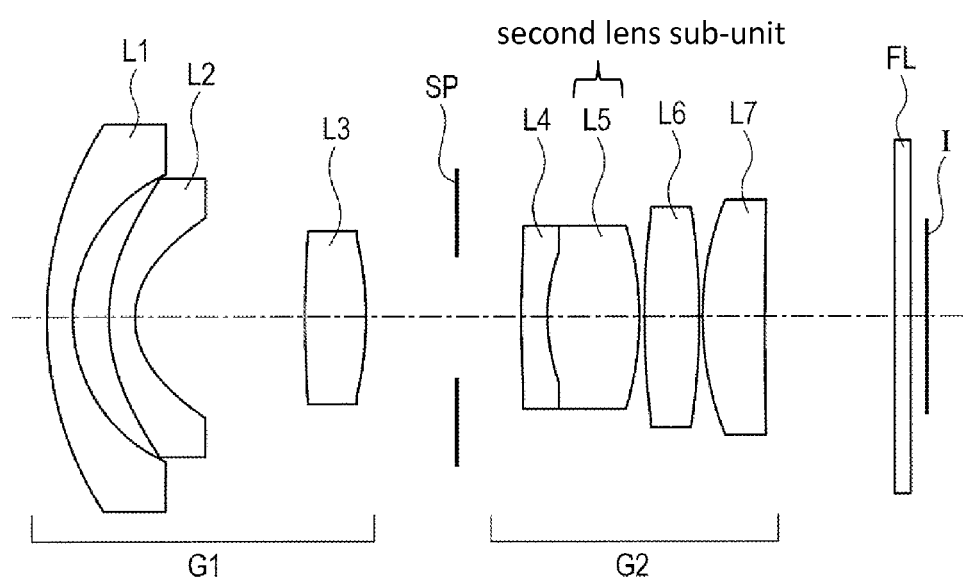
FIG. 3 is a lens cross-sectional view according to Numerical Embodiment 2 of the present invention.

FIG. 3 is a lens cross-sectional view of an image pickup lens according to Embodiment 2 (Numerical Embodiment 2) of the present invention. The lens structure is exactly the same as in Embodiment 1. Note that, extraordinary dispersion glass is used for the positive lens L5, and the positive lens L5 serves as the second lens sub-unit.

Note that, the material of the lens barrel member for regulating the distance between lenses and the back focus is aluminum.

Figure 4A:
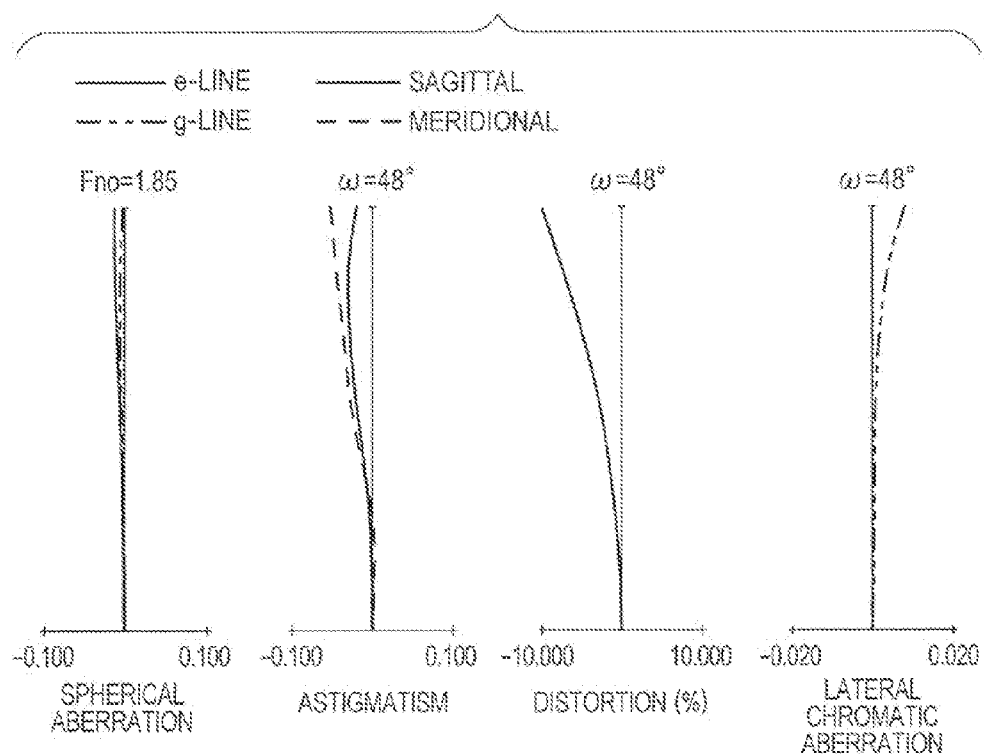
FIG. 4A is a longitudinal aberration diagram at an object distance of 1 m according to Numerical Embodiment 2.
Figure 4B:
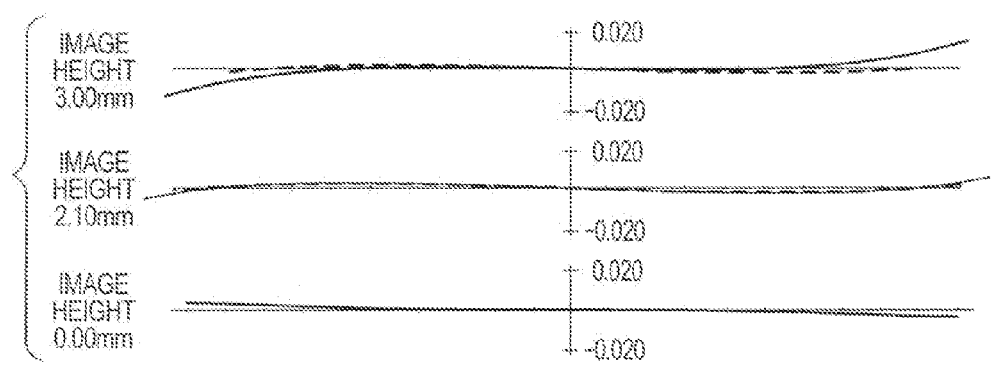
FIG. 4B is a lateral aberration diagram at an object distance of 1 m according to Numerical Embodiment 2.

FIG. 4A is a longitudinal aberration diagram at an object distance of 1 m according to Numerical Embodiment 2. FIG. 4B is a lateral aberration diagram at an object distance of 1 m according to Numerical Embodiment 2.

Table 1 shows corresponding values of Embodiment 2 in regard to Conditional Expressions (1) to (10). Numerical Embodiment 2 satisfies all the conditional expressions, thereby realizing an image pickup lens which is compact and lightweight with a large angle of field and a small f-number and in which chromatic aberration is satisfactorily corrected and a temperature-related imaging position change is suppressed.

Embodiment 3

Figure 5:
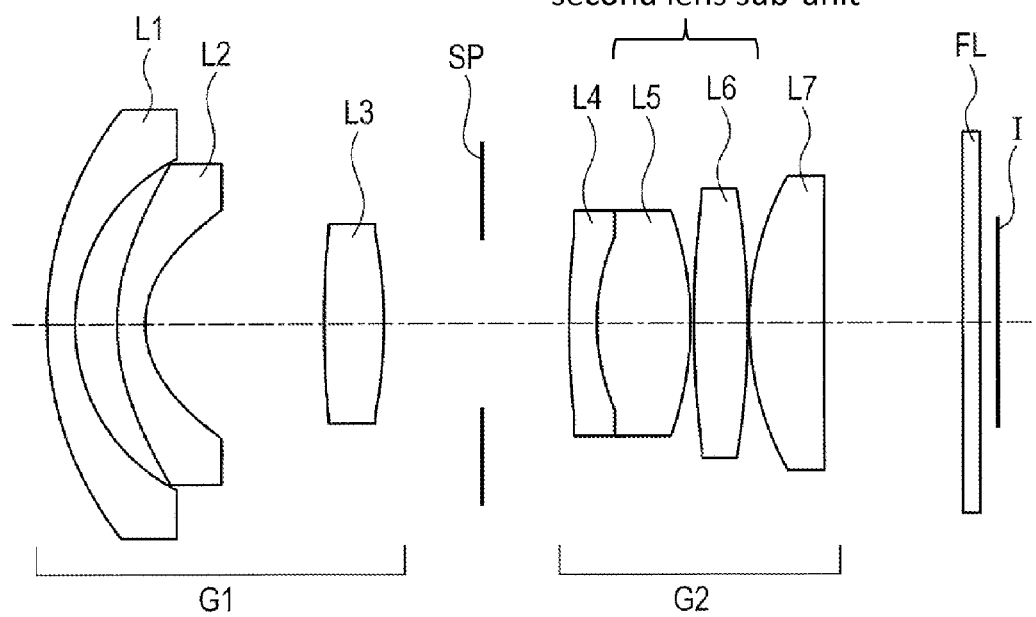
FIG. 5 is a lens cross-sectional view according to Numerical Embodiment 3 of the present invention.

FIG. 5 is a lens cross-sectional view of an image pickup lens according to Embodiment 3 (Numerical Embodiment 3) of the present invention. The lens structure is exactly the same as in Embodiment 1. Note that, extraordinary dispersion glass is used for the positive lenses L5 and L6, and the positive lenses L5 and L6 serve as the second lens sub-unit.

Note that, the material of the lens barrel member for regulating the distance between lenses and the back focus is aluminum.

Figure 6A:
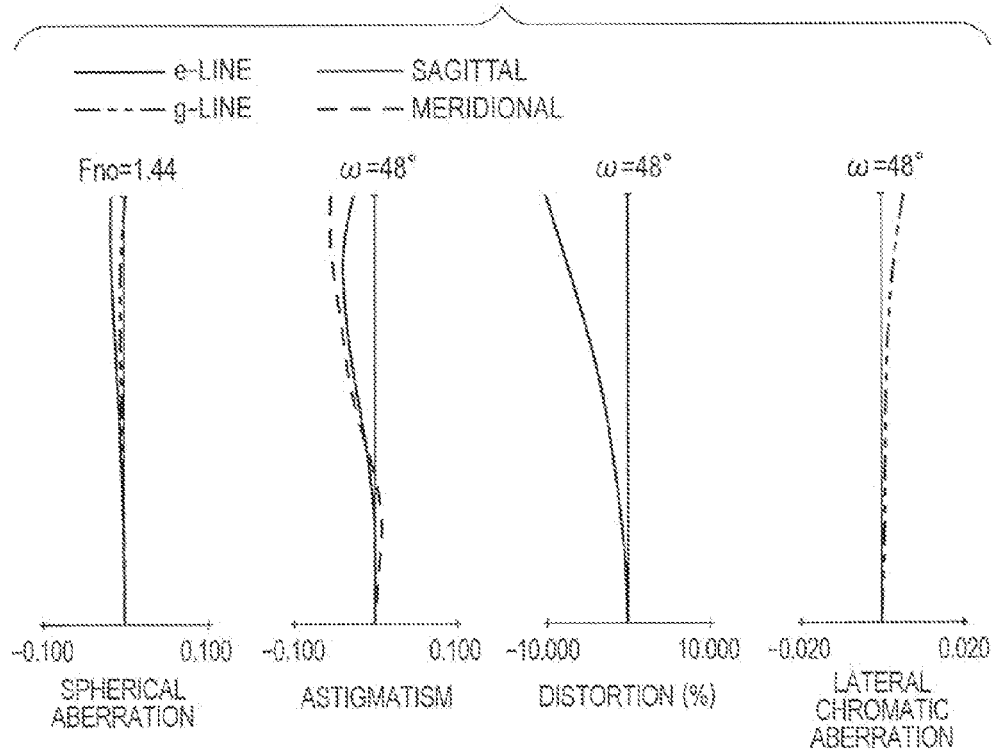
FIG. 6A is a longitudinal aberration diagram at an object distance of 1 m according to Numerical Embodiment 3.
Figure 6B:
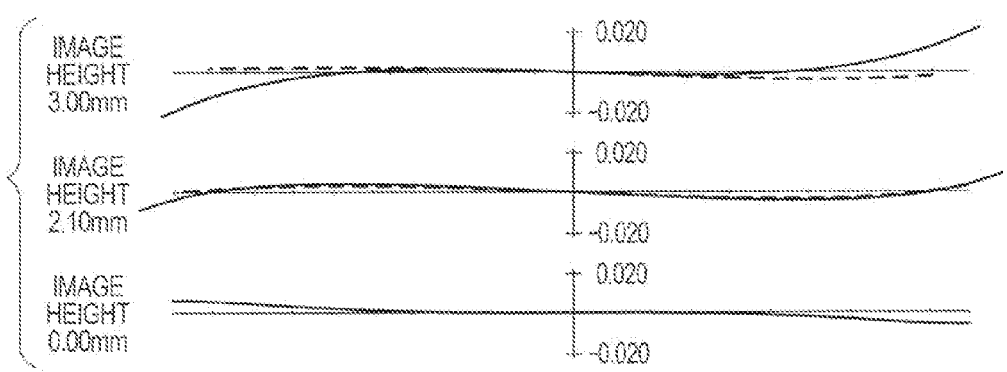
FIG. 6B is a lateral aberration diagram at an object distance of 1 m according to Numerical Embodiment 3.

FIG. 6A is a longitudinal aberration diagram at an object distance of 1 m according to Numerical Embodiment 3. FIG. 6B is a lateral aberration diagram at an object distance of 1 m according to Numerical Embodiment 3.

Table 1 shows corresponding values of Embodiment 3 in regard to Conditional Expressions (1) to (10). Numerical Embodiment 3 satisfies all the conditional expressions, thereby realizing an image pickup lens which is compact and lightweight with a large angle of field and a small f-number and in which chromatic aberration is satisfactorily corrected and a temperature-related imaging position change is suppressed.

Embodiment 4

Figure 7:
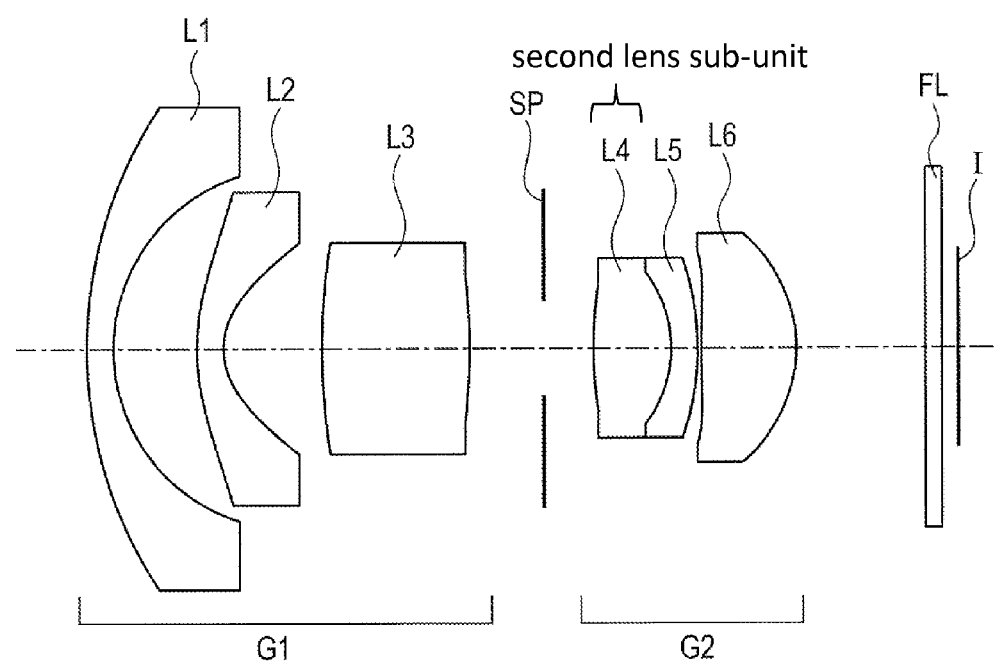
FIG. 7 is a lens cross-sectional view according to Numerical Embodiment 4 of the present invention.

FIG. 7 is a lens cross-sectional view of an image pickup lens according to Embodiment 4 (Numerical Embodiment 4) of the present invention. The image pickup lens according to Embodiment 4 includes, in order from the object side to the image side, a first lens unit G1, an aperture stop SP, and a second lens unit G2 having a positive refractive power. The first lens unit G1 includes, in order from the object side to the image side, negative meniscus lenses L1 and L2 each having a convex surface facing the object side, and a positive lens L3. The second lens unit G2 includes, in order from the object side to the image side, a cemented lens in which a positive lens L4 and a negative lens L5 are cemented together, and a positive lens L6 having an aspherical surface. Note that, extraordinary dispersion glass is used for the positive lens L4, and the positive lens L4 serves as the second lens sub-unit.

A parallel flat plate FL corresponds to a low pass filter, an IR cut filter, or the like. An image plane I corresponds to an image plane of a solid-state image pickup element (photoelectric transducer) or the like for receiving light of an image formed by the lens and subjecting the light to photoelectric conversion. Note that, the material of a lens barrel member for regulating a distance between lenses and a back focus is aluminum.

Figure 8A:
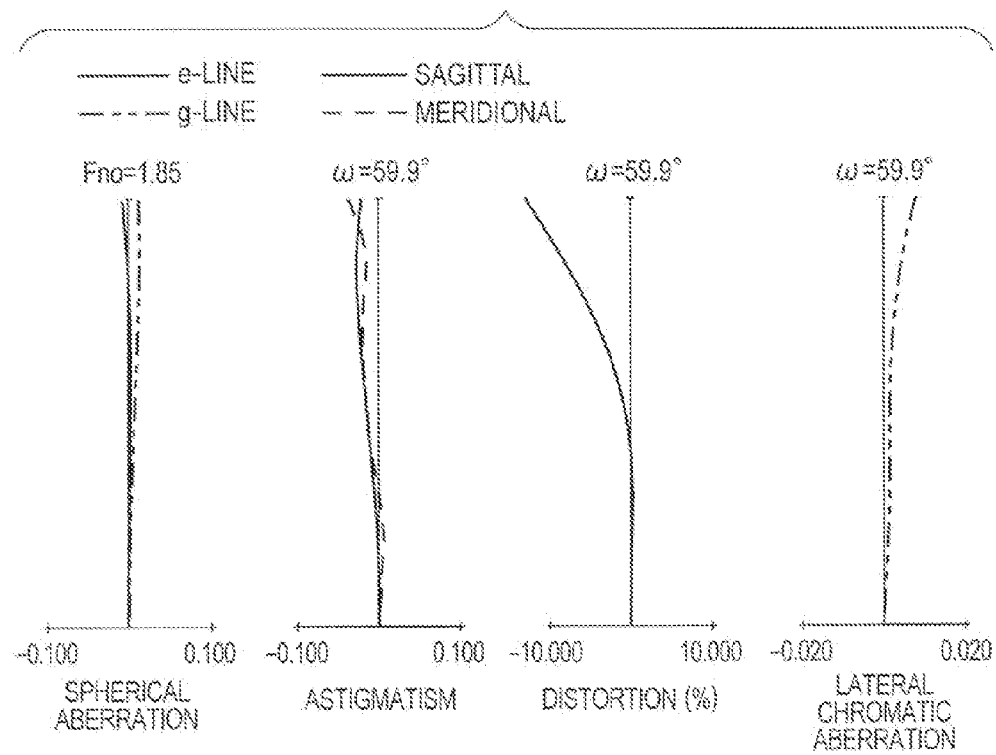
FIG. 8A is a longitudinal aberration diagram at an object distance of 1 m according to Numerical Embodiment 4.
Figure 8B:
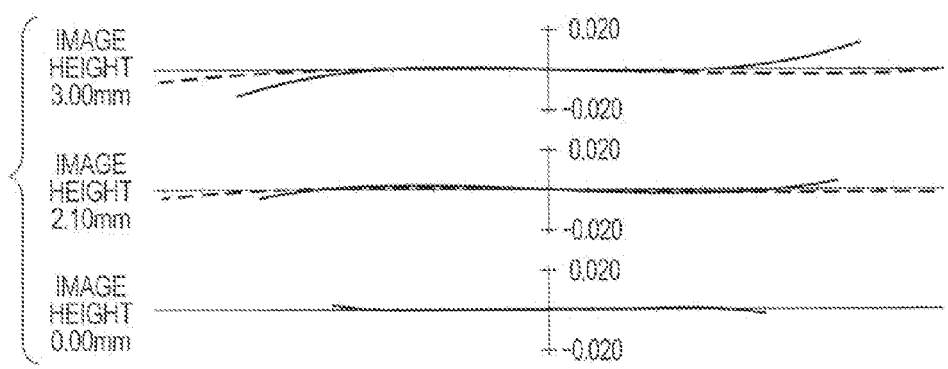
FIG. 8B is a lateral aberration diagram at an object distance of 1 m according to Numerical Embodiment 4.

FIG. 8A is a longitudinal aberration diagram at an object distance of 1 m according to Numerical Embodiment 4. FIG. 8B is a lateral aberration diagram at an object distance of 1 m according to Numerical Embodiment 4.

Table 1 shows corresponding values of Embodiment 4 in regard to Conditional Expressions (1) to (10). Numerical Embodiment 4 satisfies all the conditional expressions, thereby realizing an image pickup lens which is compact and lightweight with a large angle of field and a small f-number and in which chromatic aberration is satisfactorily corrected and a temperature-related imaging position change is suppressed.

Embodiment 5

Figure 9:
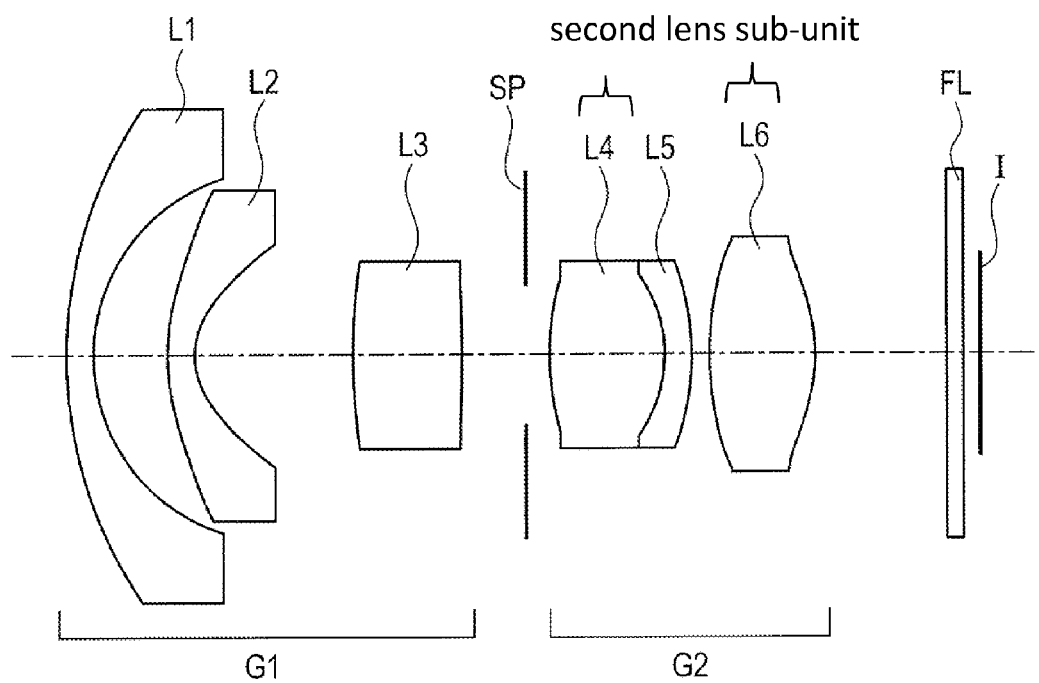
FIG. 9 is a lens cross-sectional view according to Numerical Embodiment 5 of the present invention.

FIG. 9 is a lens cross-sectional view of an image pickup lens according to Embodiment 5 (Numerical Embodiment 5) of the present invention. The lens structure is exactly the same as in Embodiment 4. Note that, extraordinary dispersion glass is used for the positive lenses L4 and L6, and the positive lenses L4 and L6 serve as the second lens sub-unit.

Note that, the material of the lens barrel member for regulating the distance between lenses and the back focus is aluminum.

Figure 10A:
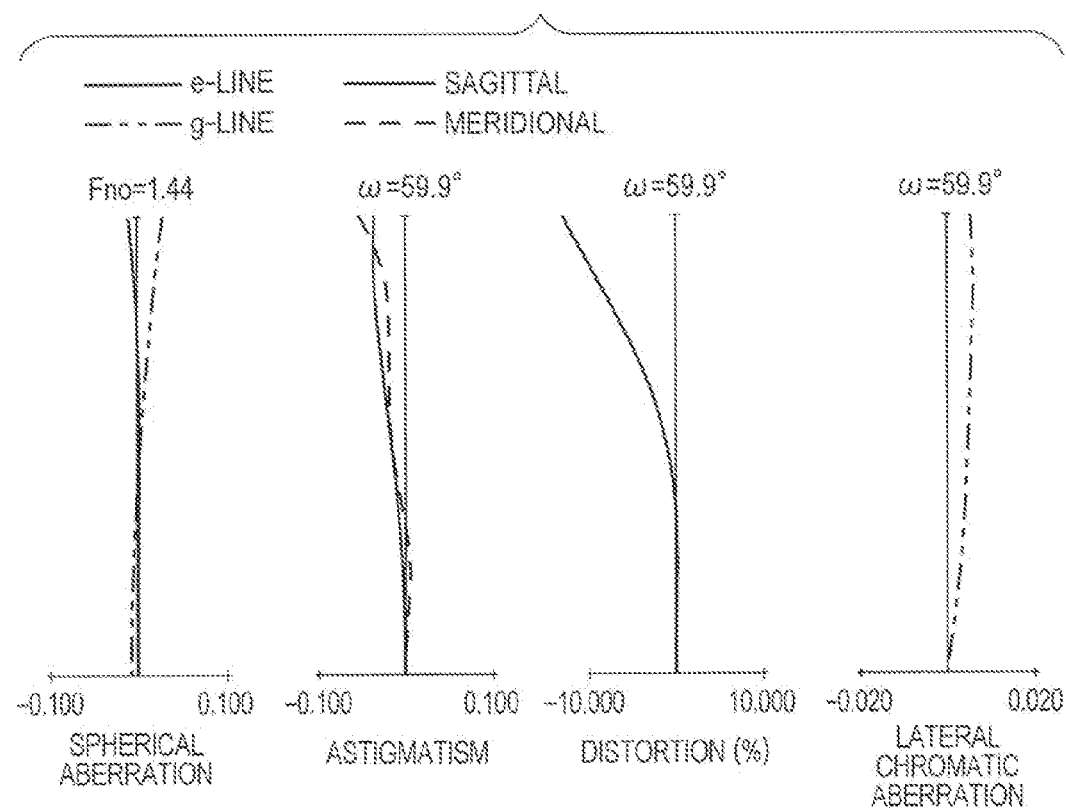
FIG. 10A is a longitudinal aberration diagram at an object distance of 1 m according to Numerical Embodiment 5.
Figure 10B:
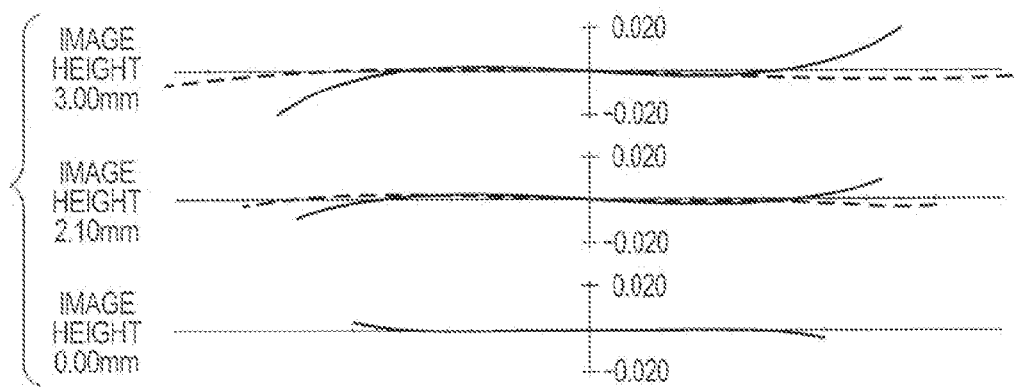
FIG. 10B is a lateral aberration diagram at an object distance of 1 m according to Numerical Embodiment 5.

FIG. 10A is a longitudinal aberration diagram at an object distance of 1 m according to Numerical Embodiment 5. FIG. 10B is a lateral aberration diagram at an object distance of 1 m according to Numerical Embodiment 5.

Table 1 shows corresponding values of Embodiment 5 in regard to Conditional Expressions (1) to (10). Numerical Embodiment 5 satisfies all the conditional expressions, thereby realizing an image pickup lens which is compact and lightweight with a large angle of field and a small f-number and in which chromatic aberration is satisfactorily corrected and a temperature-related imaging position change is suppressed.

Figure 11:
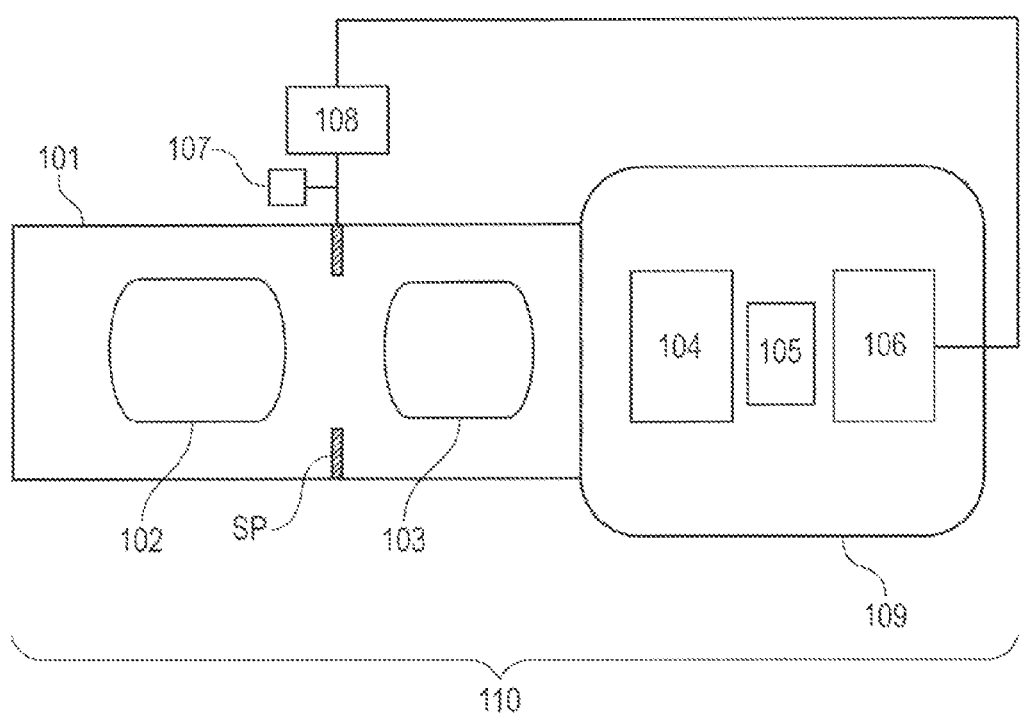
FIG. 11 is a schematic diagram illustrating a main part of an image pickup apparatus according to the present invention.

FIG. 11 is a schematic diagram illustrating a main part of an image pickup apparatus 110. FIG. 11 illustrates an image pickup lens 101 (single focus lens) according to any one of Embodiments 1 to 5, a first lens unit 102, a second lens unit 103, and an aperture stop SP. An image pickup unit (camera) 109 includes an image pickup element and the like.

A motor (drive unit) 108 electrically drives the aperture stop SP. A detector 107, such as an encoder, a potentiometer, and a photosensor, detects a stop diameter of the aperture stop SP. A glass block 104 inside the camera 109 corresponds to a low pass filter, an IR cut filter, or the like. A solid-state image pickup element (photoelectric transducer) 105, such as a CCD sensor and a CMOS sensor, receives light of a subject image formed by the single focus lens 101. A CPU 106 controls various kinds of driving of the image pickup lens 101, the calculation of image processing, and the like.

Applying the image pickup lens of the present invention to an image pickup camera or the like in this way realizes an image pickup apparatus having high optical performance.

The exemplary embodiments of the present invention are described above, but the present invention is not limited to these embodiments and can be modified and changed variously within the scope of the gist thereof.

Numerical Embodiments 1 to 5 corresponding to Embodiments 1 to 5 of the present invention are described below. In each numerical embodiment, the surface number represents the order of a surface from the object side, r represents the radius of curvature, d represents the lens thickness or the inter-surface distance, and nd and νd represent the refractive index and the Abbe constant of an optical member, respectively. Data on aspherical surfaces are marked with * on the side of the surface number.

The aspherical shape is expressed in Expression 1 where an X axis corresponds to the optical axis, an H axis corresponds to an axis perpendicular to the optical axis, a travelling direction of light corresponds to a positive direction, "R" represents a paraxial radius of curvature, "k" represents a conic constant, and each of "A4", "A6", "A8", "A10", and "A12" represents an aspherical coefficient. Further, "e-Z" means "×10$^{-Z}$".

$$X = \frac{H^2/R}{1 + \sqrt{1 - (1+k)(H/R)^2}} + A4H^4 + A6H^6 + A8H^8 + A10H^{10} + A12H^{12} \tag{1}$$

Numerical Embodiment 1

Unit: mm

Surface data

| Surface number | r | d | nd | νd | Effective diameter |
|---|---|---|---|---|---|
| 1 | 9.506 | 0.80 | 1.80400 | 46.6 | 10.60 |
| 2 | 4.605 | 1.06 | | | 7.94 |
| 3* | 5.351 | 0.80 | 1.58313 | 59.4 | 7.71 |
| 4* | 2.411 | 5.32 | | | 6.00 |
| 5 | 44.521 | 1.72 | 2.00069 | 25.5 | 4.45 |
| 6 | −11.719 | 2.47 | | | 4.02 |
| 7 (Stop) | ∞ | 1.87 | | | 3.67 |
| 8 | 23.066 | 0.80 | 1.95906 | 17.5 | 3.59 |
| 9 | 5.578 | 3.43 | 1.55332 | 71.7 | 3.49 |
| 10 | −8.933 | 0.15 | | | 5.40 |
| 11 | 20.695 | 1.63 | 1.49700 | 81.5 | 5.98 |
| 12 | −30.189 | 0.09 | | | 6.43 |
| 13 | 9.814 | 1.89 | 1.77250 | 49.6 | 6.81 |
| 14 | 184.683 | 3.99 | | | 6.69 |
| 15 | ∞ | 0.50 | 1.51633 | 64.1 | 10.00 |
| 16 | ∞ | 0.50 | | | 10.00 |
| Image plane | ∞ | | | | |

Aspherical surface data

Third surface

K = −1.04978e+000  A 4 = 1.81276e−003  A 6 = −2.22766e−004  A 8 = 1.40361e−005
A10 = −5.52816e−007  A12 = 1.00402e−008

Fourth surface

K = −9.51025e−001  A 4 = 5.11349e−003  A 6 = −4.40018e−004  A 8 = 3.54637e−005
A10 = −3.15904e−006  A12 = 1.08491e−007

Various data

| | |
|---|---|
| Focal length | 2.90 |
| F-number | 1.854 |
| Half angle of field | 48.98 |
| Image height | 3.00 |
| Lens overall length | 26.86 |
| BF | 4.99 |
| Entrance pupil position | 4.94 |
| Exit pupil position | −36.27 |
| Front principal point position | 7.61 |
| Rear principal point position | −2.40 |

Lens unit data

| Unit | First surface | Focal length | Lens configuration length | Front principal point position | Rear principal point position |
|---|---|---|---|---|---|
| 1 | 1 | 32.59 | 9.71 | 23.19 | 43.94 |
| 2 | 7 | 6.70 | 9.86 | 5.50 | −1.28 |
| 3 | 15 | ∞ | 0.50 | 0.16 | −0.16 |

-continued

Unit: mm

Single lens data

| Lens | First surface | Focal length |
|---|---|---|
| 1 | 1 | −11.98 |
| 2 | 3 | −8.36 |
| 3 | 5 | 9.41 |
| 4 | 8 | −7.85 |
| 5 | 9 | 6.78 |
| 6 | 11 | 24.97 |
| 7 | 13 | 13.35 |
| 8 | 15 | 0.00 |

Numerical Embodiment 2

Unit: mm

Surface data

| Surface number | r | d | nd | vd | Effective diameter |
|---|---|---|---|---|---|
| 1 | 10.866 | 0.80 | 1.72916 | 54.7 | 10.84 |
| 2 | 4.803 | 1.11 | | | 8.12 |
| 3* | 5.693 | 0.80 | 1.55332 | 71.7 | 7.89 |
| 4* | 2.442 | 5.21 | | | 6.15 |
| 5 | 35.650 | 1.87 | 1.90366 | 31.3 | 4.91 |
| 6 | −10.719 | 2.79 | | | 4.49 |
| 7 (Stop) | ∞ | 1.98 | | | 3.71 |
| 8 | 29.399 | 0.80 | 1.92286 | 18.9 | 3.60 |
| 9 | 5.765 | 2.82 | 1.55332 | 71.7 | 3.67 |
| 10 | −9.831 | 0.15 | | | 5.18 |
| 11 | 24.395 | 1.69 | 1.51633 | 64.1 | 5.71 |
| 12 | −22.065 | 0.10 | | | 6.23 |
| 13 | 9.534 | 1.91 | 1.77250 | 49.6 | 6.66 |
| 14 | 132.428 | 3.99 | | | 6.55 |
| 15 | ∞ | 0.50 | 1.51633 | 64.1 | 10.00 |
| 16 | ∞ | 0.50 | | | 10.00 |
| Image plane | ∞ | | | | |

Aspherical surface data

Third surface

K = −9.49449e−001  A 4 = 1.49704e−003  A 6 = −1.99514e−004  A 8 = 1.10616e−005
A10 = −3.91278e−007  A12 = 6.43519e−009

Fourth surface

K = −9.17463e−001  A 4 = 4.58466e−003  A 6 = −4.11385e−004  A 8 = 3.09367e−005
A10 = −2.81263e−006  A12 = 9.70174e−008

Various data

| Focal length | 3.00 |
|---|---|
| F-number | 1.85 |
| Half angle of field | 48.01 |
| Image height | 3.00 |
| Lens overall length | 26.87 |
| BF | 4.99 |
| Entrance pupil position | 5.07 |
| Exit pupil position | −29.37 |
| Front principal point position | 7.77 |
| Rear principal point position | −2.50 |

-continued

Unit: mm

Lens unit data

| Unit | First surface | Focal length | Lens configuration length | Front principal point position | Rear principal point position |
|---|---|---|---|---|---|
| 1 | 1 | 27.64 | 9.80 | 20.25 | 36.47 |
| 2 | 7 | 6.82 | 9.45 | 5.30 | −1.26 |
| 3 | 15 | ∞ | 0.50 | 0.16 | −0.16 |

Single lens data

| Lens | First surface | Focal length |
|---|---|---|
| 1 | 1 | −12.50 |
| 2 | 3 | −8.47 |
| 3 | 5 | 9.30 |
| 4 | 8 | −7.90 |
| 5 | 9 | 7.02 |
| 6 | 11 | 22.72 |
| 7 | 13 | 13.21 |
| 8 | 15 | 0.00 |

Numerical Embodiment 3

Unit: mm

Surface data

| Surface number | r | d | nd | vd | Effective diameter |
|---|---|---|---|---|---|
| 1 | 9.748 | 0.80 | 1.77250 | 49.6 | 11.17 |
| 2 | 5.255 | 1.19 | | | 8.70 |
| 3* | 5.981 | 0.80 | 1.69350 | 53.2 | 8.43 |
| 4* | 2.585 | 5.11 | | | 6.48 |
| 5 | 28.630 | 1.70 | 2.00100 | 29.1 | 5.24 |
| 6 | −13.722 | 2.80 | | | 4.84 |
| 7 (Stop) | ∞ | 2.47 | | | 4.74 |
| 8 | 22.518 | 0.80 | 1.95906 | 17.5 | 4.65 |
| 9 | 6.223 | 2.66 | 1.49700 | 81.5 | 4.52 |
| 10 | −9.380 | 0.10 | | | 5.91 |
| 11 | 28.102 | 1.53 | 1.49700 | 81.5 | 6.58 |
| 12 | −23.071 | 0.05 | | | 7.06 |
| 13 | 8.429 | 2.14 | 1.77250 | 49.6 | 7.71 |
| 14 | 376.608 | 3.97 | | | 7.50 |
| 15 | ∞ | 0.50 | 1.51633 | 64.1 | 10.00 |
| 16 | ∞ | 0.50 | | | 10.00 |
| Image plane | ∞ | | | | |

Aspherical surface data

Third surface

K = −1.32242e+000  A 4 = 5.20488e−004  A 6 = −1.48931e−004  A 8 = 1.11905e−005
A10 = −4.18229e−007  A12 = 6.39074e−009

Fourth surface

K = −9.99466e−001  A 4 = 3.58264e−003  A 6 = −4.74680e−004  A 8 = 4.62609e−005
A10 = −2.61091e−006  A12 = 5.95543e−008

Various data

| | |
|---|---|
| Focal length | 3.00 |
| F-number | 1.44 |
| Half angle of field | 48.02 |
| Image height | 3.00 |
| Lens overall length | 26.96 |
| BF | 4.97 |
| Entrance pupil position | 5.28 |

-continued

| Unit: mm | |
|---|---|
| Exit pupil position | −48.59 |
| Front principal point position | 8.10 |
| Rear principal point position | −2.50 |

Lens unit data

| Unit | First surface | Focal length | Lens configuration length | Front principal point position | Rear principal point position |
|---|---|---|---|---|---|
| 1 | 1 | 45.11 | 9.61 | 29.49 | 55.08 |
| 2 | 7 | 6.53 | 9.75 | 5.67 | −1.30 |
| 3 | 15 | ∞ | 0.50 | 0.16 | −0.16 |

Single lens data

| Lens | First surface | Focal length |
|---|---|---|
| 1 | 1 | −16.00 |
| 2 | 3 | −7.27 |
| 3 | 5 | 9.46 |
| 4 | 8 | −9.19 |
| 5 | 9 | 7.98 |
| 6 | 11 | 25.75 |
| 7 | 13 | 11.13 |
| 8 | 15 | 0.00 |

Numerical Embodiment 4

| Unit: mm | | | | | |
|---|---|---|---|---|---|
| Surface data | | | | | |
| Surface number | r | d | nd | vd | Effective diameter |
| 1 | 13.048 | 0.80 | 1.72916 | 54.7 | 13.50 |
| 2 | 5.418 | 2.52 | | | 9.58 |
| 3* | 6.750 | 0.80 | 1.55332 | 71.7 | 8.68 |
| 4* | 2.058 | 2.98 | | | 6.35 |
| 5 | 19.995 | 4.45 | 2.00069 | 25.5 | 5.88 |
| 6 | −18.928 | 2.24 | | | 4.22 |
| 7 (Stop) | ∞ | 1.51 | | | 2.82 |
| 8 | 12.487 | 2.34 | 1.55332 | 71.7 | 3.36 |
| 9 | −3.752 | 0.80 | 1.92286 | 18.9 | 4.24 |
| 10 | −8.215 | 0.10 | | | 4.99 |
| 11* | 29.915 | 2.89 | 1.58313 | 59.4 | 5.33 |
| 12* | −3.987 | 3.90 | | | 6.35 |
| 13 | ∞ | 0.50 | 1.51633 | 64.1 | 10.00 |
| 14 | ∞ | 0.50 | | | 10.00 |
| Image plane | ∞ | | | | |

Aspherical surface data

Third surface

K = −1.94531e+000   A 4 = −3.09257e−004   A 6 = −1.06411e−004   A 8 = 7.59464e−006
A10 = −2.37906e−007   A12 = 3.10972e−009

Fourth surface

K = −9.58691e−001   A 4 = 2.22709e−004   A 6 = −3.93665e−004   A 8 = 1.76771e−005
A10 = −3.48121e−007   A12 = 1.37046e−008

Eleventh surface

K = −1.10719e+002   A 4 = −2.05379e−003   A 6 = −8.73467e−005   A 8 = 1.10319e−006
A10 = −1.01202e−006   A12 = 6.39237e−009

-continued

| Unit: mm |
|---|
| Twelfth surface |

K = −3.25120e+000   A 4 = −3.44869e−003   A 6 = 4.42330e−005   A 8 = 3.41073e−006
A10 = −9.32801e−007   A12 = 1.92139e−008

| Various data | |
|---|---|
| Focal length | 2.00 |
| F-number | 1.85 |
| Half angle of field | 59.91 |
| Image height | 3.00 |
| Lens overall length | 26.14 |
| BF | 4.90 |
| Entrance pupil position | 5.17 |
| Exit pupil position | −100.03 |
| Front principal point position | 7.13 |
| Rear principal point position | −1.50 |

| Lens unit data | | | | | |
|---|---|---|---|---|---|
| Unit | First surface | Focal length | Lens configuration length | Front principal point position | Rear principal point position |
| 1 | 1 | −16.62 | 11.54 | −4.98 | −23.87 |
| 2 | 7 | 5.11 | 7.63 | 4.85 | −1.00 |
| 3 | 13 | ∞ | 0.50 | 0.16 | −0.16 |

| Single lens data | | |
|---|---|---|
| Lens | First surface | Focal length |
| 1 | 1 | −13.30 |
| 2 | 3 | −5.70 |
| 3 | 5 | 10.31 |
| 4 | 8 | 5.50 |
| 5 | 9 | −8.19 |
| 6 | 11 | 6.23 |
| 7 | 13 | 0.00 |

Numerical Embodiment 5

| Unit: mm | | | | | |
|---|---|---|---|---|---|
| Surface data | | | | | |
| Surface number | r | d | nd | vd | Effective diameter |
| 1 | 12.783 | 0.80 | 1.77250 | 49.6 | 13.50 |
| 2 | 5.451 | 2.19 | | | 9.64 |
| 3* | 6.519 | 0.80 | 1.55332 | 71.7 | 9.00 |
| 4* | 2.139 | 4.69 | | | 6.57 |
| 5 | 18.835 | 3.22 | 1.95906 | 17.5 | 5.10 |
| 6 | −44.018 | 1.89 | | | 3.80 |
| 7 (Stop) | ∞ | 0.71 | | | 4.06 |
| 8 | 8.237 | 3.40 | 1.43875 | 94.9 | 4.19 |
| 9 | −4.044 | 0.80 | 1.95906 | 17.5 | 4.37 |
| 10 | −7.680 | 0.53 | | | 5.10 |
| 11* | 9.309 | 3.13 | 1.55332 | 71.7 | 6.19 |
| 12* | −4.944 | 3.90 | | | 6.37 |
| 13 | ∞ | 0.50 | 1.51633 | 64.1 | 10.00 |
| 14 | ∞ | 0.50 | | | 10.00 |
| Image plane | ∞ | | | | |

-continued

Unit: mm

Aspherical surface data

Third surface

K = −2.13664e+000  A 4 = −1.03063e−004  A 6 = −1.07352e−004  A 8 = 7.73577e−006
A10 = −2.29290e−007  A12 = 2.97657e−009

Fourth surface

K = −9.60291e−001  A 4 = 2.24345e−004  A 6 = −3.85137e−004  A 8 = 2.07413e−005
A10 = −4.35811e−007  A12 = 2.73398e−008

Eleventh surface

K = −2.31297e+000  A 4 = −3.55059e−004  A 6 = 2.80314e−005  A 8 = 6.45316e−006
A10 = −1.04930e−007  A12 = 1.40978e−009

Twelfth surface

K = −4.62509e+000  A 4 = −1.10781e−003  A 6 = 1.05266e−004  A 8 = 4.66334e−006
A10 = −4.58068e−007  A12 = 4.11357e−008

Various data

| | |
|---|---|
| Focal length | 2.00 |
| F-number | 1.44 |
| Half angle of field | 59.91 |
| Image height | 3.00 |
| Lens overall length | 26.88 |
| BF | 4.90 |
| Entrance pupil position | 5.06 |
| Exit pupil position | −83.03 |
| Front principal point position | 7.01 |
| Rear principal point position | −1.50 |

Lens unit data

| Unit | First surface | Focal length | Lens configuration length | Front principal point position | Rear principal point position |
|---|---|---|---|---|---|
| 1 | 1 | −10.81 | 11.70 | −1.94 | −17.96 |
| 2 | 7 | 5.60 | 8.56 | 5.22 | −1.91 |
| 3 | 13 | ∞ | 0.50 | 0.16 | −0.16 |

Single lens data

| Lens | First surface | Focal length |
|---|---|---|
| 1 | 1 | −12.92 |
| 2 | 3 | −6.15 |
| 3 | 5 | 14.11 |
| 4 | 8 | 6.75 |
| 5 | 9 | −9.98 |
| 6 | 11 | 6.33 |
| 7 | 13 | 0.00 |

TABLE 1

Corresponding values of conditional expressions in Numerical Embodiments 1 to 5

| | Embodiment | | | | |
|---|---|---|---|---|---|
| | 1 | 2 | 3 | 4 | 5 |
| f | 2.900 | 3.000 | 3.000 | 2.000 | 2.000 |
| f1 | 32.590 | 27.637 | 45.109 | −16.616 | −10.808 |
| f2 | 6.697 | 6.821 | 6.534 | 5.110 | 5.602 |
| ν1p | 25.460 | 31.320 | 29.130 | 25.460 | 17.470 |
| ν1n | 52.980 | 63.180 | 51.400 | 63.180 | 60.640 |
| ν2p | 67.610 | 61.810 | 70.890 | 65.530 | 83.310 |
| ν2n | 17.470 | 18.900 | 17.470 | 18.900 | 17.470 |
| Y | 3.000 | 3.000 | 3.000 | 3.000 | 3.000 |
| Fno | 1.854 | 1.854 | 1.442 | 1.854 | 1.442 |
| n1p | 2.001 | 1.904 | 2.001 | 2.001 | 1.959 |

TABLE 1-continued

Corresponding values of conditional expressions in Numerical Embodiments 1 to 5

| | Embodiment | | | | |
|---|---|---|---|---|---|
| | 1 | 2 | 3 | 4 | 5 |
| ncn | 1.959 | 1.923 | 1.959 | 1.923 | 1.959 |
| ncp | 1.553 | 1.553 | 1.497 | 1.553 | 1.439 |
| f2a | 5.332 | 7.020 | 6.092 | 5.500 | 3.267 |
| B.F | 4.990 | 4.990 | 4.970 | 4.900 | 4.900 |
| TD | 22.030 | 22.030 | 22.150 | 21.430 | 22.160 |
| Conditional Expression 1 | 0.544 | 0.427 | 0.492 | 0.364 | 0.612 |
| Conditional Expression 2 | 4.415 | 4.415 | 4.457 | 4.373 | 4.522 |

TABLE 1-continued

Corresponding values of conditional expressions
in Numerical Embodiments 1 to 5

| | Embodiment | | | | |
|---|---|---|---|---|---|
| | 1 | 2 | 3 | 4 | 5 |
| Conditional Expression 3 | 1.512 | 1.618 | 2.080 | 0.719 | 0.925 |
| Conditional Expression 4 | 2.3E-5 | 2.3E-5 | 2.3E-5 | 2.3E-5 | 2.3E-5 |
| Conditional Expression 5 | 0.433 | 0.440 | 0.459 | 0.391 | 0.357 |
| Conditional Expression 6 | 3.870 | 3.270 | 4.058 | 3.467 | 4.769 |
| Conditional Expression 7 | 0.406 | 0.370 | 0.462 | 0.370 | 0.520 |
| Conditional Expression 8 | 0.089 | 0.109 | 0.067 | -0.120 | -0.185 |
| Conditional Expression 9 | 0.481 | 0.496 | 0.567 | 0.403 | 0.288 |
| Conditional Expression 10 | 2.001 | 1.904 | 2.001 | 2.001 | 1.959 |

"E-Z" means "$\times 10^{-Z}$".

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-072746, filed Mar. 29, 2013, which is hereby incorporated by reference herein in its entirety.

What is claimed is:

1. An image pickup apparatus, comprising:
   an image pickup lens; and
   an image pickup element,
   wherein the image pickup lens comprises in order from an object side to an image side:
      a first lens unit;
      a stop; and
      a second lens unit having a positive refractive power, the second lens unit comprising a second lens sub-unit composed of one or more positive lenses,
   wherein each of the positive lenses included in the second lens sub-unit is made of material satisfying the following conditions:

$$62 < \nu 2a;$$

$$N2a < 1.63;$$

$$0.605 - (\nu 2a/1000) < \theta 2a; \text{ and}$$

$$dn2a/dT\text{relative} \leftarrow 2.4 \times 10^{-6},$$

where N2a represents a refractive index at a d-line, ν2a represents an Abbe constant, θ2a represents a partial dispersion ratio, and dn2a/dTrelative represents an absolute value of a differential of refractive indices against temperature at the d-line, and
   wherein the following conditions are satisfied:

$$0.20 < f/f2a < 0.80; \text{ and}$$

$$3.00 < TD/BF < 6.50,$$

where f represents a focal length of the image pickup lens, f2a represents a focal length of the second lens sub-unit, TD represents an overall length of the image pickup lens, and BF represents a distance from an image-side surface of a lens arranged closest to an image side in the image pickup lens to an image plane of the image pickup element.

2. The image pickup apparatus according to claim 1, wherein the following condition is satisfied:

$$0.40 < f2/(Y \times Fno) < 3.00 \text{ (unit:mm)},$$

where Y represents a maximum image height at the image pickup element, and Fno represents an f-number in an infinite state.

3. The image pickup apparatus according to claim 1, wherein the following condition is satisfied:

$$1.50 \times 10^{-5} < \alpha < 2.50 \times 10^{-5},$$

where α represents a linear expansion coefficient of a material of a lens barrel member for regulating an interval between the image-side surface of the lens arranged closest to the image side and the image plane.

4. The image pickup apparatus according to claim 1, wherein the second lens unit comprises at least one negative lens and at least two positive lenses, and
   wherein the following conditions are satisfied:

$$0.20 < f/f2 < 0.70; \text{ and}$$

$$2.00 < \nu 2p/\nu 2n < 6.00,$$

where f2 represents a focal length of the second lens unit, ν2p represents an average value of Abbe constants of the at least two positive lenses of the second lens unit, and ν2n represents an average value of an Abbe constant of the at least one negative lens of the second lens unit.

5. The image pickup apparatus according to claim 1, wherein the second lens unit comprises a cemented lens including a negative lens and a positive lens, and at least one positive lens, and
   wherein the following condition is satisfied:

$$0.20 < ncn - ncp < 0.60,$$

where ncn represents a refractive index at the d-line of the negative lens of the cemented lens, and ncp represents a refractive index at the d-line of the positive lens of the cemented lens.

6. The image pickup apparatus according to claim 1, wherein the first lens unit comprises, in order from the object side to the image side, two negative lenses and one positive lens,
   wherein the second lens unit comprises at least one negative lens and at least two positive lenses,
   wherein the two negative lenses of the first lens unit each comprise a meniscus lens having a convex surface facing the object side, and
   wherein the following conditions are satisfied:

$$-0.25 < f/f1 < 0.25;$$

$$0.20 < \nu 1p/\nu 1n < 0.70; \text{ and}$$

$$1.85 < n1p < 2.40,$$

where f1 represents a focal length of the first lens unit, ν1p represents an average value of an Abbe constant of the one positive lens of the first lens unit, ν1n represents an average value of Abbe constants of the two negative lenses of the first lens unit, and n1p represents a refractive index at the d-line of the one positive lens of the first lens unit.

7. An image pickup lens comprising in order from an object side to an image side:
   a first lens unit;
   a stop; and a second lens unit having a positive refractive power, the second lens unit comprising a second lens sub-unit composed of one or more positive lenses,
wherein each of the positive lenses included in the second lens sub-unit is made of material, the material satisfying the following conditions:

$62 < \nu 2a;$ $N2a < 1.63;$ $0.605 - (\nu 2a/1000) < \theta 2a;$ and $dn2a/dTrelative < -2.4 \times 10^{-6},$ where N2a represents a refractive index at a d-line, ν2a represents an Abbe constant, θ2a represents a partial dispersion ratio, and dn2a/dTrelative represents an absolute value of a differential of refractive indices against temperature at the d-line, and
wherein the following conditions are satisfied:

$0.20 < f/f2a < 0.80;$ and $3.00 < TD/BF < 6.50,$ where f represents a focal length of the image pickup lens, f2a represents a focal length of the second lens sub-unit, TD represents an overall length of the image pickup lens, and BF represents a distance from an image-side surface of a lens arranged closest to an image side in the image pickup lens to an image plane of an image pickup element.

* * * * *